(No Model.)
WALTER LORD & WILL LORD.
MACHINE FOR OPENING AND CLEANING COTTON, &c.
No. 369,350. Patented Sept. 6, 1887.
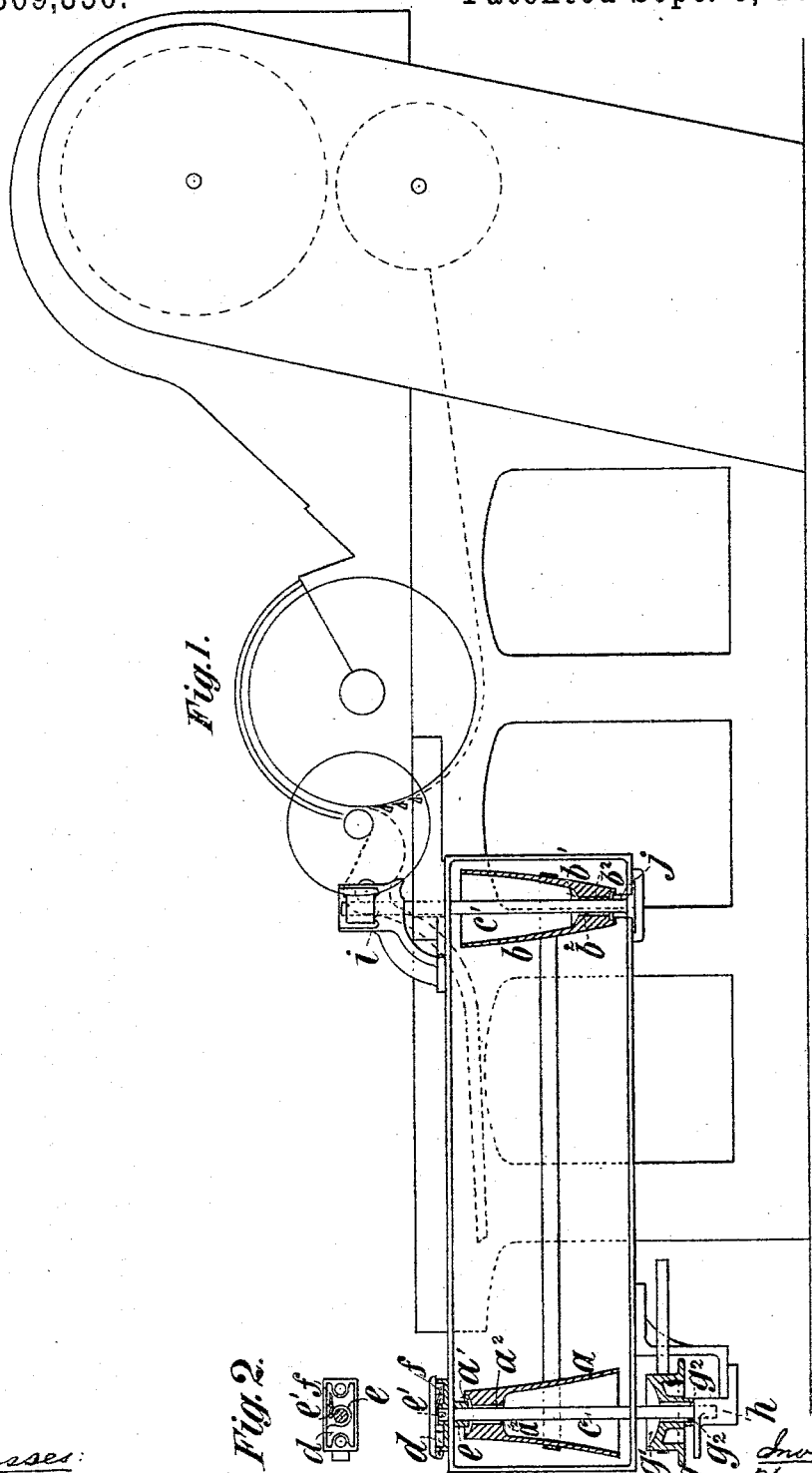

UNITED STATES PATENT OFFICE.

WALTER LORD AND WILL LORD, OF TODMORDEN, COUNTY OF YORK, ENGLAND.

MACHINE FOR OPENING AND CLEANING COTTON, &c.

SPECIFICATION forming part of Letters Patent No. 369,350, dated September 6, 1887.

Application filed December 17, 1886. Serial No. 221,840. (No model.) Patented in England December 5, 1885, No. 14,927.

*To all whom it may concern:*

Be it known that we, WALTER LORD and WILL LORD, both subjects of the Queen of Great Britain, residing at Todmorden, in the county of York, England, have invented a certain new and useful Improvement in Machines for Opening and Cleaning Cotton and other Fiber, (for which we have obtained a patent in Great Britain, No. 14,927, dated December 5, 1885,) of which the following is a specification.

Our invention relates to improvements in machines for opening and cleaning cotton and other fiber; and the object of our improvements is to prevent the oil or other lubricant employed for lubricating the shafts of the vertical cone-drums from reaching the outer surfaces of the drums and the belt or belts thereon which drive the machine. We attain this object substantially in the manner and by the means shown on the accompanying drawings, in which—

Figure 1 is a side elevation, partly in section, of a single opening or cleaning machine to which our invention has been applied. Fig. 2 is a plan of the oil-reservoir which we make around the upper bearing of one of the cone-drums.

In the views, $a$ and $b$ designate the pair of vertical cone-drums, mounted, respectively, on the shafts $c$ and $c'$, the cone $a$ being the driver. $d$ is an oil-reservoir, which we make around the upper part of the upper bearing, $e$, of the shaft $c$, and $e'$ is a hole which we form in the bearing $e$. In the hole $e'$ we place a piece of cotton-wick or other suitable material, $f$, to convey oil or other lubricant from the reservoir $d$ to the shaft $c$.

The top surface of the cone $a$ is dished or recessed at $a'$, and passages $a^2$, or a single passage if preferred, are made through the solid part of the said cone parallel to and preferably opening onto the shaft $c$, as shown. The lower part of said cone is hollow, the passage $a^2$ communicating with its interior. On the shaft $c$ is also keyed the driving-pulley $g$, which is, similarly to the cone $a$, dished or recessed at $g'$ and provided with, say, two passages, $g^2$. Any oil that is conducted from the reservoir $d$ through the hole $e'$ in the upper bearing, $e$, is caught in the dish $a'$ and flows through the passages $a^2$, down the shaft $c$ to the dish $g'$, and thence through the passages $g^2$ to the footstep $h$. In like manner the driven cone $b$ is dished at $b'$ and provided with passages $b^2$, so that any oil escaping from the upper bearing, $i$, runs down the shaft $c'$ and passes through the passages $b^2$ to the lower bearing or footstep, $j$.

The cone-pulleys $a$ and $b$ may be transposed, the hollow end of either pulley serving as an oil-receiving recess when turned upward in the position of pulley $b$. Each pulley has also a recess at the other end, which catch oil when the pulley is in the position of pulley $a$. Thus it will be seen that none of the oil or other lubricant employed for lubricating the shafts $c$ $c'$ can reach the outer surfaces of the cones $a$ and $b$ and the driving-pulley $g$, and thus the oil is kept from contact with the belt or belts employed to drive the machine, whereby much slipping is avoided, while nevertheless thorough lubrication of the shafts and lower bearings or footsteps, as well as the upper bearings, is insured.

Having stated the nature of our invention and described the manner of performing the same, we declare that what we claim, and desire to secure by Letters Patent of the United States, is—

1. In combination with a vertical shaft, a cone-drum mounted thereon, said drum being provided with a dish or recess to receive a lubricant escaping from above, and a passage to allow the lubricant to pass downward through said pulley along said shaft, substantially as set forth.

2. The combination, with the vertical cone-drum $a$, mounted on the shaft $c$ and provided with a dished portion, $a'$, and a passage or passages, such as $a^2$, of the driving-pulley $g$, also mounted on the shaft $c$ and provided with a dished portion, $g'$, and a passage or passages, such as $g^2$, all substantially as herein set forth, for the purposes specified.

3. The combination of a shaft and its upper bearing, the latter provided with oil-reservoir $d$ and hole $e'$, with a cone-pulley having a recess arranged under said bearing to receive the drip from said reservoir, and the passage $a^2$, leading downward from said recess along said shaft, substantially as set forth.

4. A cone-pulley provided with a recess at one end, a hollow part at the other end, and a passage extending from said recess to the interior of said hollow part to conduct lubricant along the shaft on which said pulley is mounted, in order that either end of said pulley may be turned upward to catch the dripping lubricant, substantially as set forth.

The foregoing specification of our improvement in machines for opening and cleaning cotton and other fiber signed by us this 3d day of December, 1886.

WALTER LORD.
     WILL LORD.

Witnesses:
 H. B. BARLOW,
 S. W. GILLETT,
 *Both of* 17 *St. Ann's Square, Manchester.*